No. 648,390.　　　　　　　　　　　　　　　Patented May 1, 1900.
C. E. COE.
MICROMETER AND GAGE.
(Application filed Jan. 5, 1900.)

(No Model.)

Witnesses:
F. L. Ourand
J. C. Exley

Inventor:
Charles E. Coe.
by W. T. Fitzgerald
Attorneys.

UNITED STATES PATENT OFFICE.

CHARLES E. COE, OF ST. LOUIS, MISSOURI, ASSIGNOR TO THE MICROMETER-CALIPER COMPANY, OF SAME PLACE.

MICROMETER AND GAGE.

SPECIFICATION forming part of Letters Patent No. 648,390, dated May 1, 1900.

Application filed January 5, 1900. Serial No. 451. (No model.)

*To all whom it may concern:*

Be it known that I, CHARLES E. COE, a citizen of the United States, residing at St. Louis, in the State of Missouri, have invented certain new and useful Improvements in Micrometers and Gages; and I do hereby declare the following to be a full, clear, and exact description of the invention, such as will enable others skilled in the art to which it appertains to make and use the same.

My invention relates to certain new and useful improvements in gages, and more particularly to that variety thereof designated a "micrometer," the use of said instrument, as is well known, being for the purpose of promptly measuring the diameter and truing the circumferential face of a shaft, mandrel, or other object, the instrument being especially desirable and valuable for use in connection with turning-lathes.

A further object of my invention is to combine with said instrument a feature of construction which will fit it for other uses, as for a sheet-metal gage, and also for measuring drills and the diameters of wires.

A further object of my invention is to provide an instrument of the character specified the parts of which may be very cheaply and expeditiously manufactured and assembled in their respective operative positions ready for use.

A further object is to so form the several parts of my invention that the same may be individually removed and replaced without disturbing the other parts in case it may be desirable to do so.

A further object is to provide means for compensating for the wear upon the calipering-points, as said points shall become worn away incident to the use thereof.

Other objects and advantages will be made fully apparent from the following specification, considered in connection with the accompanying drawings, in which—

Figure 1:
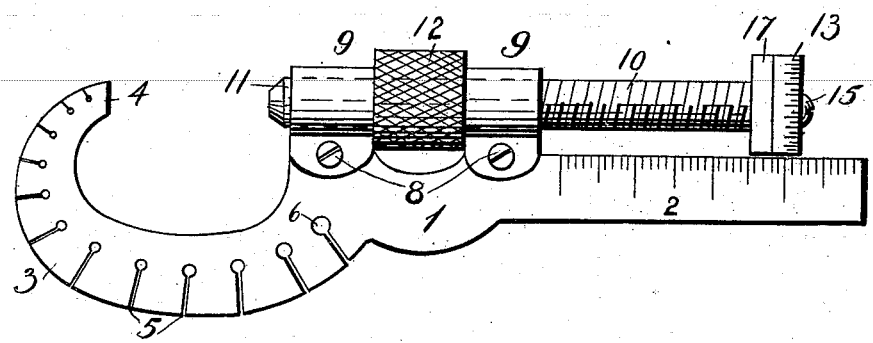
Figure 2:
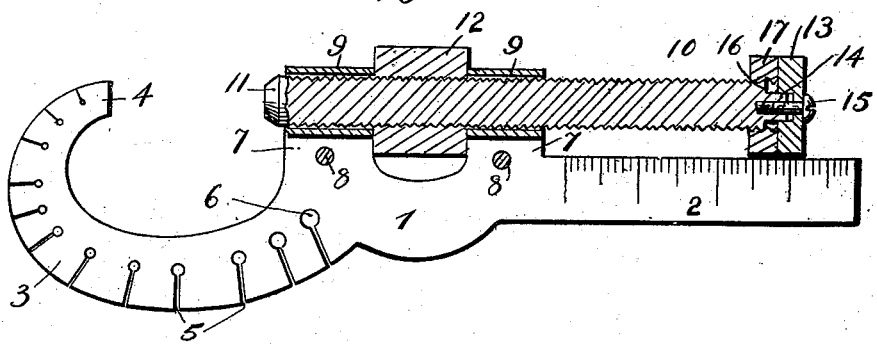

Figure 1 is a side elevation of my combined micrometer and gage complete. Fig. 2 is a similar view to that presented in Fig. 1, excepting that certain parts are shown in central longitudinal section.

For convenience in referring to the several details of my invention and the coöperating features numerals will be employed, of which 1 is the body portion proper of my improved micrometer and gage, which is provided with the graduated end 2 and with the usual curved lip or terminal branch 3, forming one of the caliper-points, as indicated by the numeral 4, said terminal branch being curved substantially as shown, while the outer edge thereof is provided with a series of graduated slots 5, each of which terminates in a cylindrical bore or aperture 6, the purpose of said construction being hereinafter specifically set forth. The body portion is provided with the anchoring-points 7, to which I secure, as by the set-screws 8, the barrels 9, through which is designed to loosely play the threaded shaft 10, which is provided with the pointed terminal 11, forming a calipering-point designed to act as the complement of the point 4.

In order to control the threaded shaft 10 and enable the operator to readily reciprocate the same within its supporting-barrels 9, I provide the knurled or thumb nut 12, which, as will be seen by reference to Fig. 2, is threaded on said shaft, and it is obvious that by a proper rotation of said nut said shaft may be thrust inwardly toward the point 4 or withdrawn therefrom, as desired.

The graduated end 2 is, as will be seen by reference to the drawings, disposed parallel with the threaded shaft 10, and designed to coöperate with the graduations upon said terminal 2 is the graduated indicator or index wheel 13.

It will be understood that the graduations upon the branch 2 and the wheel 13 are so formed that they will coöperate or register with each other, the graduations upon the index-wheel being so designated that the position occupied by the point 11 with respect to the point 4 may be readily determined at a glance.

In order to compensate for wear upon the points 4 and 11, I mount the index-wheel 13 as shown in Fig. 2, in which it will be observed that the threaded shaft 10 is reduced at its outer free end, thereby forming the stem or lug 14, while the index-wheel 13 is provided with a suitable recess designed to loosely receive said lug, said wheel being held in place by the set-screw 15. Sufficient play is provided between the inner surface of the index-wheel 13 and the shoulder 16 to compensate for all ordinary wear upon said points 4 and 11, and in order to secure the graduated index-wheel 13 firmly in position I provide the follower or jam-nut 17, which is preferably of the same diameter as the wheel 13 and is provided with a threaded bore designed to receive the threaded shaft 10, and it is obvious that by a proper adjustment of the set-screw 15 the jam-nut 17 will reliably secure and hold the index-wheel 13 in an adjusted position.

If for any reason it is desired to move the index-wheel in either direction upon its journal or lug 14, the jam-nut 17 is turned so that it will move toward the knurled nut 12, which will release the wheel 13, when said wheel may be readily adjusted by a proper rotation of the set-screw 15, and after such adjustment has been effected the jam-nut is turned tightly against the index-wheel, thereby securing it in position and holding it against casual displacement until said jam-nut is loosened.

By means of the graduated slots 5 it will be observed that the thickness of sheet metal may be readily determined, since said slots may be properly designated by numbers or letters.

The apertures 6 will enable the diameter of a drill or wire to be readily determined by inserting a drill or wire in its corresponding aperture and reading the size indicated by proper number or letter adjacent to said aperture.

It will be seen that either of the barrels 9 may be quickly replaced by removal of the screws or rivets 8, while the other parts of my instrument may, if desired, be quickly removed and restored.

While I have described the preferred construction and arrangement of parts necessary to provide my improved instrument, it will be understood that I desire to comprehend in this application the substantial equivalent thereof.

Having thus fully described my invention, what I claim as new, and desire to secure by Letters Patent, is—

In a combined micrometer and gage, a body portion having a graduated and a curved terminal, the latter being provided with graduated slots merging into graduated apertures; barrels secured to said body portion and loosely receiving a threaded shaft; a thumb-nut controlling said shaft; a graduated index-wheel coöperating with the graduations upon said body portion adjustably secured upon the end of said threaded shaft and a jam-nut fitting the threads of said shaft and designed to bear against said graduated wheel when the latter has been adjusted in the desired position all combined in the manner specified and for the purpose set forth.

In testimony whereof I affix my signature in presence of two witnesses.

CHARLES E. COE.

Witnesses:
E. O. BARTHOLOMEW,
JOHN G. MANNING.